United States Patent
Hirayama et al.

(12) 
(10) Patent No.: US 6,364,231 B1
(45) Date of Patent: Apr. 2, 2002

(54) SPINNING REEL SPOOL AND LINE ECONOMIZER THEREFOR

(75) Inventors: Hirokazu Hirayama, Sakai; Shin'ichi Morimoto, Nishinomiya, both of (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/534,239

(22) Filed: Mar. 23, 2000

(30) Foreign Application Priority Data

Mar. 29, 1999 (JP) ............................................. 11-085611
Apr. 27, 1999 (JP) ............................................. 11-120507

(51) Int. Cl.$^7$ ................................................ A01K 89/01
(52) U.S. Cl. ........................ 242/322; 242/323; D22/141
(58) Field of Search ................................ D22/137, 140, D22/141; 242/322, 323

(56) References Cited

U.S. PATENT DOCUMENTS

| | | | | |
|---|---|---|---|---|
| 2,777,648 A | * | 1/1957 | Wood | 242/322 |
| 5,161,751 A | * | 11/1992 | Bolcavage | 242/322 |
| 5,785,266 A | * | 7/1998 | Bowersox | 242/322 |
| 5,947,400 A | * | 9/1999 | Tsutsumi | 242/322 |
| 6,045,077 A | * | 4/2000 | Bernard et al. | 242/322 |
| 6,164,577 A | * | 12/2000 | Koike | 242/322 |

FOREIGN PATENT DOCUMENTS

| | | | |
|---|---|---|---|
| DE | 41 11 145 A1 | * | 7/1993 |
| EP | 0 904 691 | | 3/1999 |
| FR | 2 768 900 A1 | * | 2/1999 |

* cited by examiner

Primary Examiner—Katherine A. Matecki
(74) Attorney, Agent, or Firm—Shinjyu Global IP Counselors, LLP

(57) ABSTRACT

A spinning reel spool configuration for preventing backlash as well as line-drop of fishing line off the spool flange. The flange is configured such that height of the flange rim relative to the perimeter of the bobbin trunk is at least partially not uniform. Various configurations are possible thus to define a peak bobbin-to-rim height A and a minimum bobbin-to-rim height B. The periphery of the total amount of wound-on line lies at the minimum height B. Accordingly, the portion of the flange providing the difference A–B in bobbin-to-rim height functions as barrier to backlash. Furthermore, the spool is deformed from conventional configurations, such that the shape of the spool bobbin trunk differs in different sections. The bobbin trunk in sections containing the spool axis is an isosceles trapezoid, however, in one such section, the bobbin trunk tapers forward regularly, but in another such section tapers rearward in reverse. Furthermore, in front-end cross-section the bobbin trunk is an ellipse in one orientation, whereas in rear-end cross-section the bobbin trunk is an ellipse in an orientation reversed to that of the front-end section. The major and minor axes of the front- and rear-end ellipses are thus orthogonal. In the middle, the bobbin trunk is circular in cross section. Configuring the bobbin trunk thus to taper at once regularly and in reverse prevents both backlash and line-drop when the line is wound onto the spool.

14 Claims, 19 Drawing Sheets

SPINNING REEL SPOOL AND LINE ECONOMIZER THEREFOR

BACKGROUND OF THE INVENTION

1. Technical Field

The present invention relates to fishing reel spools and an associated line economizer. More specifically, the present invention relates to spinning reel spools that are back-and-forth movable relative to the reel body, and to a line economizer fitted to such spools.

2. Description of Related Art

Generally, spinning reels include a rotor, a spool, and a reel body that rotatably supports a handle. The spool is movable back and forth relative to the reel body. The spool includes a tubular bobbin trunk, a flange, and a skirt. Fishing line is wound about the bobbin trunk. The flange is located on the front end of the bobbin trunk and has a larger radius than the bobbin trunk. The skirt is formed integrally with the bobbin trunk on its rear end. A flange-fixing member fixes the flange to the bobbin trunk.

In this type of spool, the bobbin trunk is fitted to the spool spindle directly or via a drag mechanism. The spool spindle is rotatably supported on the reel body. The bobbin trunk in section perpendicular to the spool spindle is a circle. A spool formed as a regular taper in section parallel to the spool spindle wherein the diameter decreases frontward is also known. Likewise known is a spool formed as a reverse taper in section parallel to the spool spindle wherein the diameter tapers off in a rearward direction. The flange in section perpendicular to the spool spindle is a circle concentrically with and having a larger radius than the circular cross section of the bobbin trunk.

With conventional spools of this type, when winding fishing line onto the bobbin trunk, the line is wound on to the level of the outer radius of the flange. The fishing line is then wound, taking care not to let the outer periphery of the wound-on line go over the outer diameter of the flange. The winding operation is finished before the diameter of the outer periphery of the line equals the flange outer diameter.

In the line-winding operation with conventional spools, the line is sometimes gets wound on as far as the outer rim of the flange. When fishing line winds on as far as the flange rim, the line may spill off the flange: so-called "backlash" is liable to occur.

With flat spools having neither a regular taper or any taper, backlash wherein fishing line spills frontward off the flange is likely to occur.

Although backlash is less likely to occur in a reverse-taper spool, "line-drop" is unavoidable wherein the fishing line travels skirt-rearward, invades the inside of the spool from the skirt rear end and becomes entangled in the rotor cylinder and spool spindle.

SUMMARY OF THE INVENTION

An object of the present invention is to prevent backlash of the line off the flange on a spinning reel spool.

Another object is in a spinning reel to prevent both spool backlash and line-drop.

A spool for a spinning reel according to one aspect of the present invention is a spool movable front and rear together with a spindle for spool relative to a reel body. The spool includes a tubular bobbin trunk and a flange formed on the bobbin trunk. The bobbin trunk is disposed on the spool spindle, with fishing line being wound peripherally around the bobbin trunk. The entire circumference of the rim of the flange extends outwardly from the outer periphery of the bobbin trunk. The height of the flange rim relative to the bobbin trunk differs along the bobbin trunk periphery.

As the fishing line is wound about the bobbin trunk of the spool, it reaches a point where the outer periphery of the wound-on line is the same as the flange rim along the portion(s) where the height of the flange is lowest (minimum position). At this point, between the flange rim along the portion(s) where the height of flange is highest (maximum position) and the outer periphery of the wound-on line, ample distance remains. Therefore, fishing line should be wound with reference to the flange minimum position, such that winding will end when the outer periphery of the wound-on line reaches the minimum position.

Accordingly, the line is wound on under conditions in which backlash outward off the flange is unlikely to occur.

The spool for a spinning reel according to another aspect of the invention comprises the foregoing bobbin trunk and flange, wherein at least one of the bobbin trunk and the flange is a non-circular in section substantially perpendicular to the spool spindle.

Herein, the bobbin trunk and flange are formed in an arbitrary shape that facilitates creating a difference in height between the bobbin trunk and the flange rim. This is not possible in the conventional instance in which the bobbin trunk and the flange are both circular in section perpendicular to the spool spindle.

The spool for a spinning reel according to yet another aspect of the invention comprises the foregoing bobbin trunk and flange, wherein at least one of the bobbin trunk and flange is elliptical in section substantially perpendicular to the spool spindle.

Herein, if the section substantially perpendicular to the spool spindle of either the bobbin trunk or the flange is a circle, the section of other should be an ellipse whose major or minor axis equals the radius of the circle. This accordingly creates a difference in height between the bobbin trunk and the flange rim.

The spool for a spinning reel according to a further aspect of the invention comprises the foregoing bobbin trunk and flange, wherein sections through either substantially perpendicular to the spool spindle are ellipses, wherein the major axes of the ellipses are orthogonal.

Herein, the relative height between the bobbin trunk and the flange rim changes gradually. The bobbin trunk and the flange are accordingly formed as smooth and continuous shapes, in a well-balanced relative disposition.

The spool for a spinning reel according to a still further aspect of the invention comprises the foregoing bobbin trunk and flange, wherein both are circular in section substantially perpendicular to the spool spindle, wherein the centers of the circles are mutually offset.

Offsetting the centers of the bobbin trunk and the flange facilitates creating a difference in height between the bobbin trunk and the flange rim.

The spool for a spinning reel according to yet another aspect of the invention comprises the foregoing bobbin trunk and flange, wherein the two are movable relative to each other. Accordingly the respective centers of the bobbin trunk and the flange may be brought into coincidence, wherein the height of the flange relative to the bobbin trunk is constant along the entire flange rim.

Herein, the bobbin trunk and the flange can be moved into coincident position when casting and into a centers-offset position when winding in line.

A spool for a spinning reel according to yet another aspect of the invention is movable relative to the reel body back and forth together with a spindle for the spool. The spool includes the tubular bobbin trunk, the flange, and a skirt portion. The bobbin trunk is provided on the spool spindle, wherein fishing line is wound peripherally about the bobbin trunk. The flange is provided on the front end of the bobbin trunk and is larger in diameter than the diameter of the front end of the bobbin trunk. The skirt portion is provided on the rear end of the bobbin trunk and is larger in diameter than the diameter of the rear end of the bobbin trunk. Inter-peripheral distance front-endward of the bobbin trunk in a one planar section containing the axis of the spool spindle is shorter than inter-peripheral distance in the same section rear-endward of the bobbin trunk. Inter-peripheral distance front-endward of the bobbin trunk in another axis-containing section planar section is longer in that different section than inter-peripheral distance rear-endward of the bobbin trunk.

In the one section taken through the spool to which the bobbin trunk is fitted and containing the spool spindle axis, the inter-peripheral distance on the front end is smaller than the inter-peripheral distance on the rear end in the same section. Meanwhile, in a another section taken through the spool and containing the spindle axis, the inter-peripheral distance on the front end is greater than the inter-peripheral distance on the rear end.

In other words, in one portion of the bobbin trunk, the inter-peripheral distance on the front end is shorter than the inter-peripheral distance on the rear end. In that portion the outer periphery forms a regular taper, for instance, that tapers from the rear end toward the front end. On the other hand, in another portion of the bobbin trunk, the inter-peripheral distance on the front end is longer than the inter-peripheral distance on the rear end. The outer periphery therein forms a reverse taper that tapers from the front end toward the rear end. The reverse taper prevents frontward movement of the line, so that backlash is less likely to occur. Moreover, since the regular taper at the same time prevents rearward movement of the line, line-drop is less likely to occur.

A spool for a spinning reel according to another aspect of the invention comprises the foregoing bobbin trunk, formed such that inter-peripheral distance in the one spindle-axis-containing planar section decreases heading from the rear end toward the front end, and inter-peripheral distance in the other axis-containing planar section increases heading from the rear end toward the front end.

In this case, the inter-peripheral distance in the spindle-axis-containing planar sections gradually changes. Therefore, the bobbin trunk is formed as a smooth shape.

A spool for a spinning reel according to another aspect of the invention comprises the foregoing bobbin trunk wherein at least either the front end or rear end is non-circular in section.

A spool for a spinning reel according to a further aspect comprises the foregoing bobbin trunk wherein at least either the front end or rear end is elliptical in section.

A spool for a spinning reel according to yet another aspect of the invention comprises the foregoing bobbin trunk wherein at least either the front end or rear end is substantially polygonal in section.

A spool for a spinning reel according to a still further aspect of the invention comprises the foregoing bobbin trunk wherein the one axis-containing planar section and the other axis-containing planar section are orthogonal.

In this case, the normal taper and the reversed taper are perpendicular to one another. Accordingly, the tapers can be disposed in a well-balanced manner, and also a backlash and line-drop can be prevented.

A spool for a spinning reel according to another aspect of the invention comprises the foregoing bobbin trunk wherein at least either the one axis-containing planar section or the other axis-containing planar section is substantially trapezoidal.

A spool for a spinning reel according to yet another aspect comprises the foregoing bobbin trunk wherein a cross section of the bobbin trunk at a portion between the front end and rear end as cut in a plane substantially perpendicular to the spool spindle center is circular.

According to a still further aspect of the invention, a spinning reel line economizer is for a spinning reel spool movable together with a spindle for the spool back-and-forth relative to the reel body. The line economizer includes a bobbin trunk detachably fitted to the outer periphery of a cylindrical portion of the spool on its spindle adapted to receive the bobbin trunk. The bobbin trunk is formed such that wherein it is fitted onto cylindrical portion of the spool, the inter-peripheral distance on the front end of the bobbin trunk in the one planar section containing the axis of the spool spindle is shorter than the inter-peripheral distance on the rear end in the same section. Further the bobbin trunk is formed such that wherein it is fitted onto cylindrical portion of the spool, the inter-peripheral distance on the front end in another axis-containing planar section is longer than the inter-peripheral distance on the rear end in that same section.

Herein, the line economizer wherein fitted to the spool is shaped to taper at once regularly and in reverse. This accordingly prevents backlash and line-drop as likewise described in the earlier aspects of the present invention.

The foregoing and other objects, features, aspects and advantages of the present invention will become more apparent from the following detailed description in conjunction with the accompanying drawings.

DESCRIPTION OF THE PREFERRED EMBODIMENTS

First Embodiment

Figure 1:
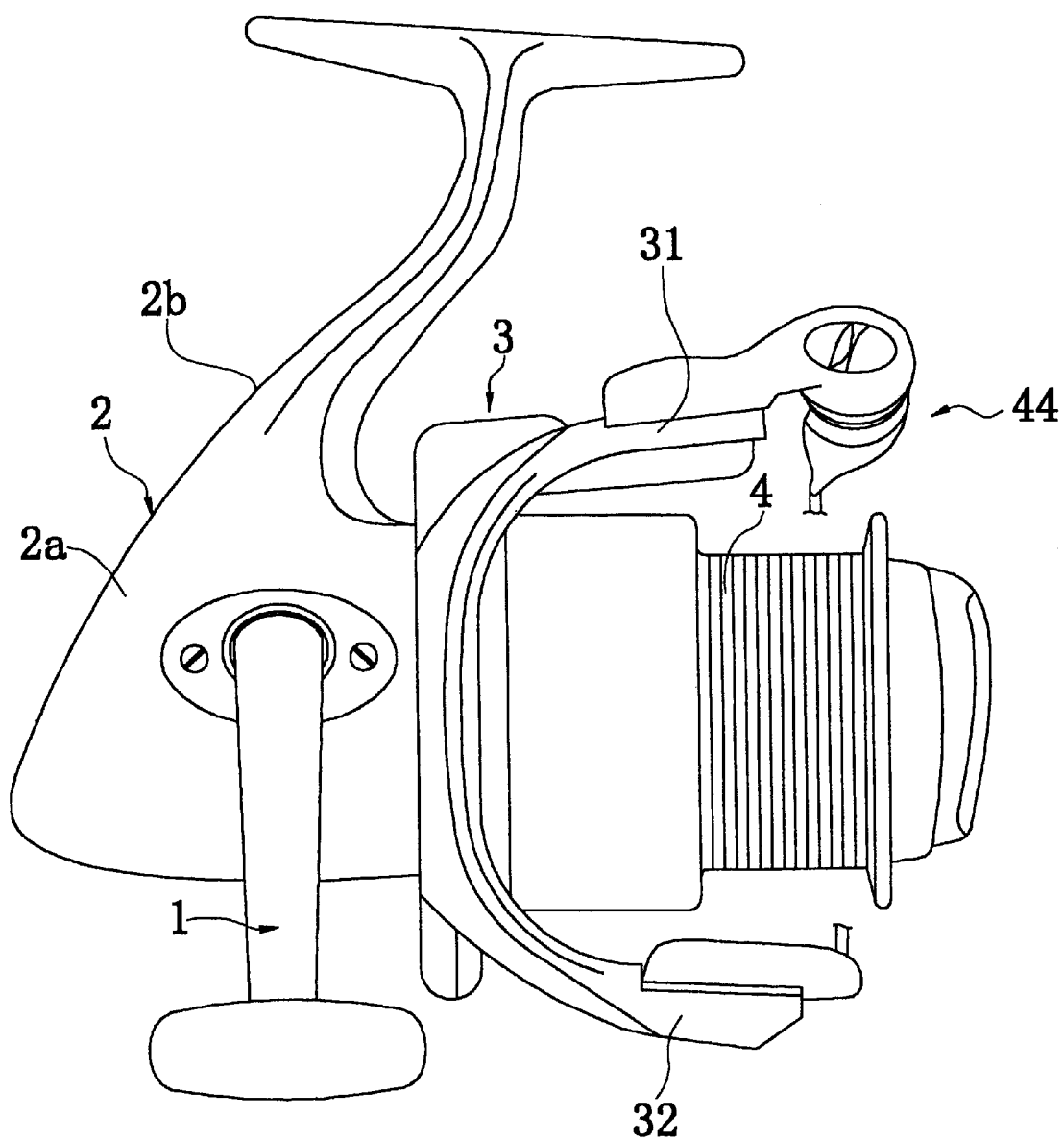
FIG. 1 is a side view of a spinning reel in accordance with the first embodiment of the present invention viewed from the right hand side.

Referring to FIG. 1, a spinning reel in accordance with a first embodiment of the present invention includes a reel main body 2, a rotor 3, and a spool 4. The reel main body 2 rotatably supports a handle 1. The rotor 3 is rotatably supported on the front the reel main body 2. The spool 4 receives line wound about its outer circumferential surface, and is disposed on the front the rotor 3 so as to be movable back and forth.

The reel main body 2 includes a reel body 2a, and a leg 2b that extends diagonally upward from the reel body 2a. As FIG. 2 indicates, there is a space inside the reel body 2a. A rotor driving mechanism 5 and an oscillating mechanism 6 are provided within the space. Coupled with rotation of the handle 1, the rotor driving mechanism 5 rotates the rotor 3. The oscillating mechanism 6 shifts the spool 4 back and forth so that the line will wind on evenly.

The rotor driving mechanism 5 includes a face gear 11 and a pinion gear 12. The face gear rotates together with a handle shaft 10 to which the handle 1 is fixed. The pinion gear 12 engages the face gear 11. The pinion gear 12 is tubularly formed, and a front portion 12a of the pinion gear 12 passes through the center of the rotor 3, and is fixed to the rotor 3 by a nut 13. The reel main body 2, via respective bearings 14a and 14b rotatably supports the axially central portion and the rear end of the pinion gear 12.

The oscillating mechanism 6 is a traverse cam type mechanism. The oscillating mechanism 6 shifts the spool spindle 15, which is coupled to the center of the spool 4 via a drag mechanism 60, back and forth such that the spool 4 shifts likewise. The oscillating mechanism 6 includes a worm shaft 21, a slider 22, and an intermediate gear 23. The worm shaft 21 is disposed below and parallel to the spool spindle 15. The slider 22 travels back and forth along the worm shaft 21. The intermediate gear 23 is fixed to an end of the worm shaft 21. The rear end of the spool spindle 15 is fixed non-rotatably to the slider 22. The intermediate gear 23 engages the pinion gear 12.

Figure 2:
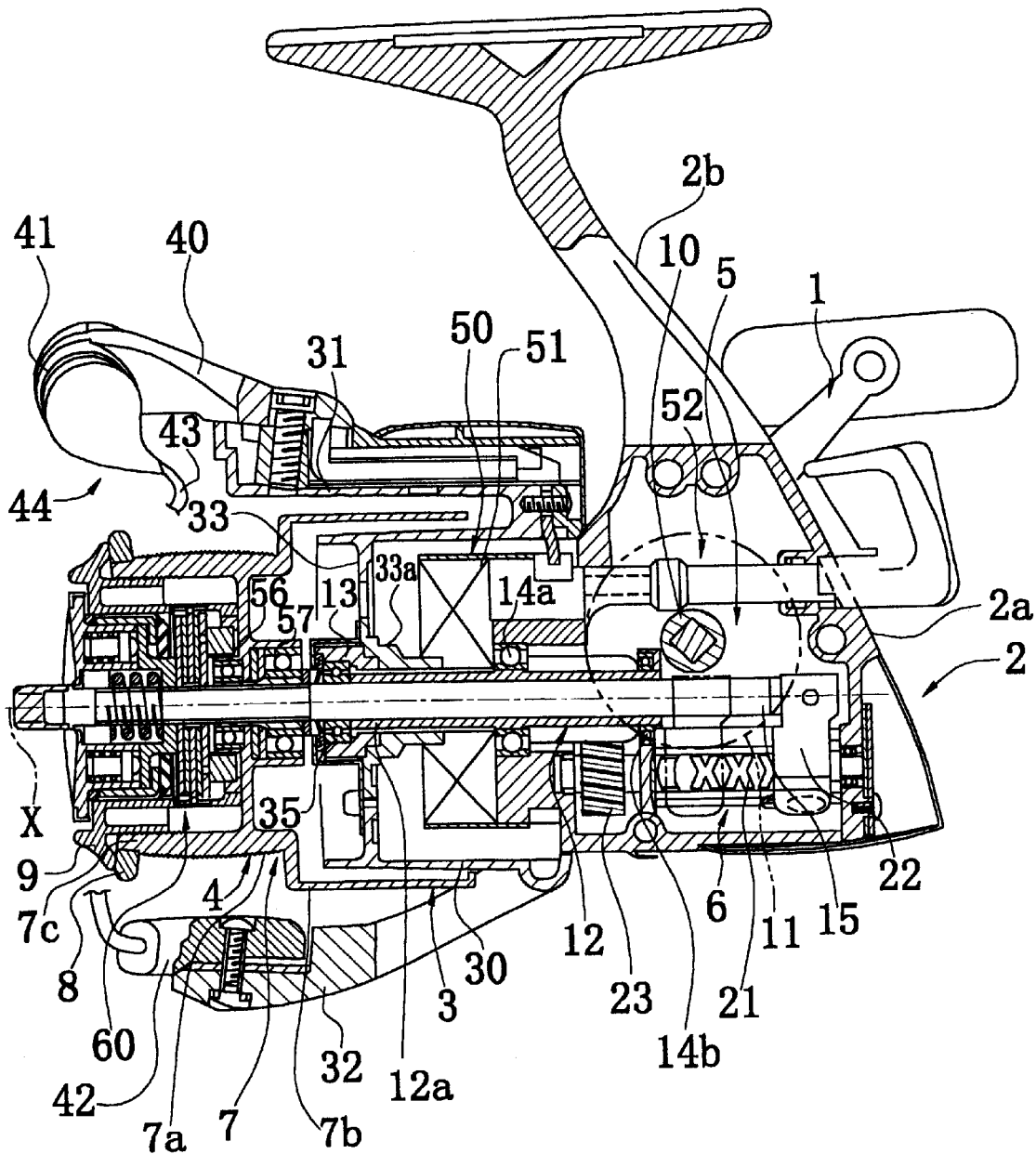
FIG. 2 is a cross sectional view of the aforementioned spinning reel viewed from the left hand side.

As shown further in FIG. 2, the rotor 3 includes a cylinder 30 and first and second rotor arms 31 and 32 disposed on mutually opposing sides of the cylinder 30. The cylinder 30 and the rotor arms 31 and 32 are formed integrally from a material such as aluminum alloy.

A front wall 33 is formed on the front of the cylinder 30, while a boss 33a is formed in the central portion of the front wall 33. A through-hole is formed in the center of the boss 33a. The spool spindle 15 and the front portion 12a of the pinion gear 12 penetrate the through hole. The nut 13 is disposed on the front of the front wall 33. A bearing 35 is disposed inside the nut 13 for rotatively supporting the spool spindle 15.

The first rotor arm 31 extends frontward from the cylinder 30, curving in an outward convex, as FIG. 1 depicts. The portion of the first rotor arm 31 connected to the cylinder 30 bends spreading in the circumferential course of the cylinder 30. A first bail support member 40 is pivotably fitted to the outer peripheral side of the end of the first rotor arm 31. A line roller 41 for guiding line onto the spool 4 is fitted to the end of the first bail support member 40.

The second rotor arm 32 extends frontward from the cylinder 30, curving in an outward convex, as FIG. 1 also depicts. Heading toward the part that is connected to the cylinder 30, the second rotor arm 32 branches in two, into a fork connected to the cylinder 30 in two places separated at a circumferential spacing. A second bail support member 42 is pivotably fitted to the inner peripheral side of the end of the second rotor arm 32.

A bail 43 is fixed between the line roller 41 and the second bail support member 42. The bail 43 is a linear material bent into an approximate U shape. The first and second bail support members 40 and 42, the line roller 41, and the bail 43 form a bail arm 44 that guides the line onto the spool 4. The bail arm 44 is pivotable between a line guiding position shown in FIG. 2 and a line let-out position that is overturned from the line guiding position.

A reverse checking mechanism 50 is disposed inside the cylinder 30 of the rotor 3, for prohibiting/releasing reverse of the rotor 3. As shown in FIG. 2, the reverse checking mechanism 50 includes a one-way clutch 51 and a switching mechanism 52. The one-way clutch 51 is a roller type clutch with a free-rotating inner wheel. The switching mechanism 52 switches the one-way clutch 51 between an operative state (reverse-checking state) and inoperative state (reverse-permitting state).

The spool 4 is disposed between the first rotor arm 31 and the second rotor arm 32 of the rotor 3. The spool 4 is fitted to the end of the spool spindle 15 via the drag mechanism 60. The spool 4 includes a spool main body 7, a flange 8, and a flange-fixing member 9. The spool main body 7 is a larger/smaller two-stage cylindrical member, obtained by forging aluminum alloy for example. The spool main body 7 is rotatably fitted to the spool spindle 15 on two bearings 56 and 57.

The spool main body 7 includes a bobbin trunk 7a, circumferentially around which fishing line winds, and a larger-diameter tubular skirt 7b which is formed integrally with the bobbin trunk 7a on the rear thereof. The larger-diameter flange 8 is fitted to the front end of the bobbin trunk 7a. The flange-fixing member 9 fixes the flange 8 to the spool main body 7.

Figure 3:
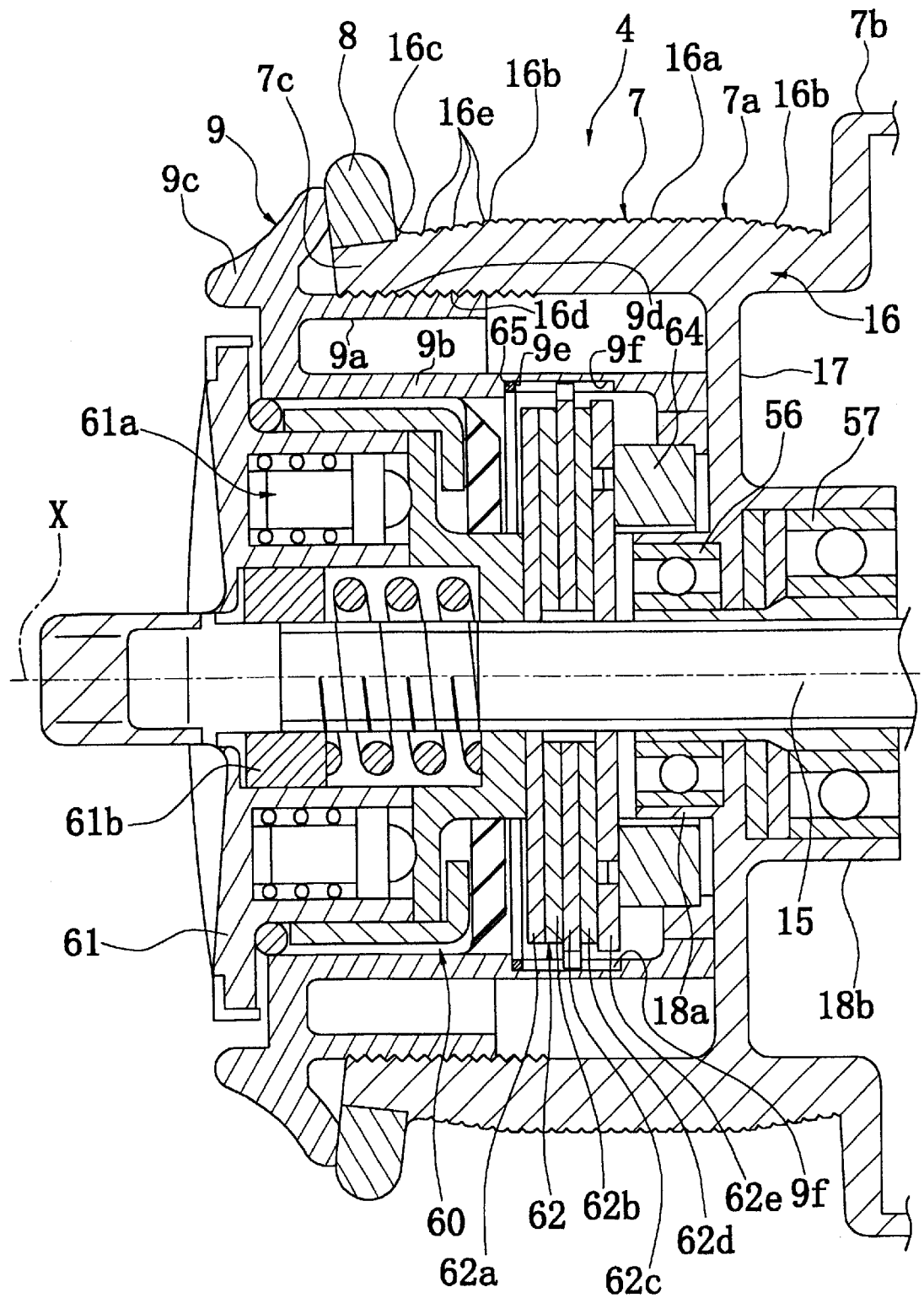
FIG. 3 is an enlarged cross sectional view of a spool of the aforementioned spinning reel.

As shown in the enlarged view of the spool 4 in FIG. 3, the bobbin trunk 7a includes: a tubular portion 16; a disk portion 17 formed integrally on the inner peripheral side of the tubular portion 16; and a pair of boss portions 18a and 18b formed on opposite inner/outer sides of the disk portion 17. The outer peripheral surface of the tubular portion 16 includes a circumferential surface 16a, a pair of tapered surfaces 16b, 16b, and a protruding surface 16c. The circumferential surface 16a is a flat surface parallel to the spool spindle axis X. The tapered surfaces of a pair 16b, 16b extend from either end of the circumferential surface 16a, diminishing in radius. The protruding surface 16c is formed the rim of the forward of the tapered surfaces 16b. The circumferential surface 16a is formed about the axial center of the tubular portion 16, and the pair of tapered surfaces 16b formed at the same axial extension at either end thereof. A plurality of annular grooves 16e triangular in cross section, for example, is formed at axially spaced separations on the peripheral surface of the tubular portion 16. Female threads 16d are formed on the inner peripheral surface of the tubular portion 16 for fitting the flange-fixing member 9. The bearings 56 and 57 are fitted into the boss portions 18a and 18b along their inner peripheries. The protruding portion 16c is provided for sandwiching the flange 8 with the flange-fixing member 9.

The skirt 7b is forged integrally with the bobbin trunk 7a, and formed so as to cover the cylinder 30 of the rotor 3.

The flange 8 inclines frontward going peripherally out, and is a planar metal or scratch-resistant hard ceramic component that is formed such that angle of inclination is 7 degrees or less. The outer diameter of the flange 8 and that of the skirt portion 7b are made to have approximately the same dimension. The flange fixing member 9, which is screwed into the female threads 16d formed on the bobbin trunk 7a inner peripheral surface, sandwiches the flange 8 between it and the bobbin trunk 7a, fixing the flange 8.

Figure 4:
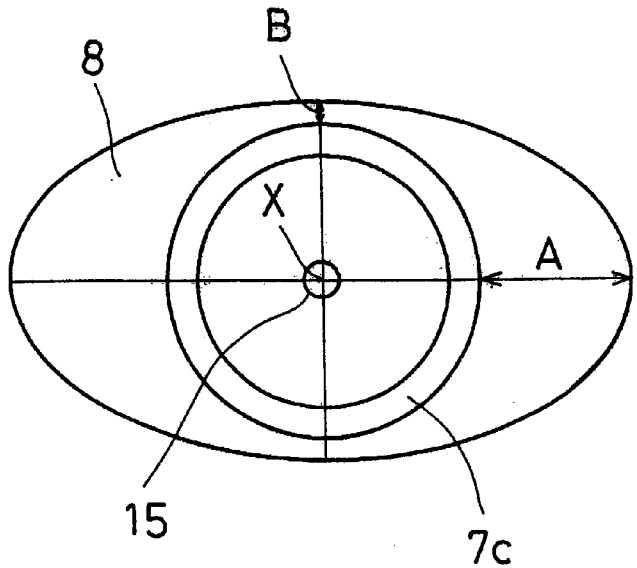
FIG. 4 is a schematic view of a cross section of the flange and the bobbin trunk of the aforementioned spool as cut in a plane perpendicular to the spool spindle.

As illustrated in FIG. 4, in a section perpendicular to the spool spindle 15 the front end 7c of the bobbin trunk 7a is a circle. In a section perpendicular to the spool spindle 15 the flange 8 is an ellipse comprehending the circular part of the front end 7c. Distance A along the major axis of the ellipse from the outer periphery of the bobbin trunk 7a to the outer periphery of the flange 8 (maximum point) and distance B along the minor axis of the ellipse from the outer periphery of the bobbin trunk 7a to the outer periphery of the flange 8 (minimum point) differ just by the difference between the major and the minor axes of the ellipse.

When fishing line winds onto the bobbin trunk 7a in the spool 4 thus, the line winds on until the minimum point on the flange 8 (where the distance from the outer periphery of the bobbin trunk 7a is B), such that at the parts of the flange 8 that are the A–B difference in distance, line will not wind on. Consequently, the parts of the flange 8 that are the A–B difference in distance become walls making backlash outward from the flange 8 unlikely to occur.

The flange-fixing member 9 includes: a screw portion 9a that screws into the female threads 16d formed on the inner peripheral surface of the spool main body 7; a tubular drag-housing portion 9b formed integrally with and on the inner peripheral side of the screw portion 9a, having space to accommodate drag plates 62a to 62e (described later); and an abutment 9c furnished on the end of the screw portion 9a for abutting on the flange 8.

Male threads 9d are formed on the outer peripheral surface of the screw portion 9a for screwing into the female threads 16d formed on the inner peripheral surface of the tubular portion 16. The drag-housing portion 9b is disposed on the inner peripheral side of and coaxial with the screw portion 9a, and the rear end thereof extends to a position adjoining the disk portion 17. An annular spring-fitting groove 9e is formed on the inner periphery of the drag-housing portion 9b for fitting a spring component 65, bent into a pentagon for example, to stop the drag plates 62a to 62e from slipping out. To the rear of the spring-fitting groove 9e, interlock grooves of a pair 9f, 9f running axially are formed for non-rotatably interlocking with drag plate 62c. The abutment 9c is an approximately disk-shaped component that joins the screw portion 9a and the drag-housing portion 9b and meanwhile is for fixing the flange 8. The peripherally outward part of the abutment 9c tapers conically, and its rear-end face abuts on the flange 8.

The drag mechanism 60, fitted between the spool 4 and the spool spindle 15, is a device for applying drag force to the spool 4. The drag mechanism 60 includes a knob 61 for manually adjusting drag force, and a friction portion 62 that includes the plurality of drag plates 62a to 62e. The knob 61 presses the plurality of drag plates 62a to 62e towards the spool 4. The knob 61 interiorly includes a sounding mechanism 61a and a nut 61b screwed onto the spool spindle 15. The drag plate 62a, a disk component made of metal, is non-rotatably locked to the spool spindle 15 and contacts the knob 61. The drag plates 62b and 62d are disk components made of felt, for example. On circumferential parts of the drag plate 62c, a disk component made of metal, are interlock projections for interlocking with the interlock grooves 9f and 9f, to rotate the drag plate 62c with the flange-fixing member 9. The drag plate 62e, also a disk component made of metal, is non-rotatably locked to the spool spindle 15. The sounding mechanism 64 is fitted to the rear end of the drag plate 62e and sounds when the spool spindle 15 and the spool 4 rotate relative to each other as the drag operates.

The following describes reel operation and action.

During casting, the bail arm 44 is turned over into the line release position. Accordingly, the first bail support member 40 and the second bail support member 42 pivot. Hooking the line with the index finger of the hand that is gripping the fish rod, the fishing rod is cast, by which the fishing line is cast out under the weight of the tackle. Rotating the handle 1 in the line-winding direction after the tackle reaches the water rotates the rotor 3 in the line-winding direction through the rotor driving mechanism 5. And a (not illustrated) bail turnover mechanism returns the bail arm 44 to the line-winding position, which prohibits the rotor 3 from reversing, thereby stopping cast-out of the fishing line.

In winding on the fishing line, the handle 1 is turned in the line take-up direction, by which the rotation is transmitted to the rotor 3 via the face gear 11 and the pinion gear 12, rotating the rotor 3. Rotation of the rotor 3 winds fishing line onto the spool 4, guided by the line roller 41. Herein, the fishing line winds onto the spool 4 only up to that minimum position at which line is initially wound onto the spool, therefore backlash is not liable to occur here, even winding on the line until the end.

Figure 5:
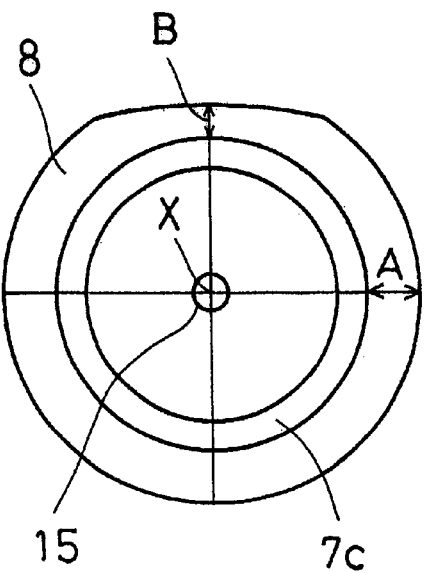
FIG. 5 is a view equivalent of the FIG. 4 of a spinning reel in accordance with another embodiment of the present invention.

Modifications (a) In the first embodiment, the flange 8 is elliptical in section perpendicular to the spool spindle 15 axis X. The flange 8 may also be shaped into a non-circular form wherein the flange 8 is formed with a cut-off part for example, as shown in FIG. 5, such that the height of the flange 8 in the flange 8 section perpendicular to the axis X changes gradually.

Figure 6:
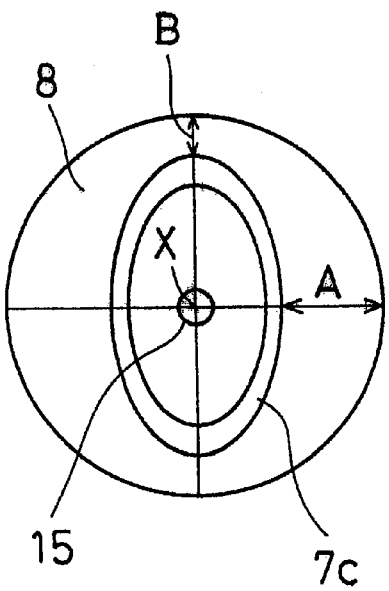
FIG. 6 is a view equivalent of the FIG. 4 of a spinning reel in accordance with still another embodiment of the present invention.

(b) In the first embodiment, the front end 7c of the bobbin trunk 7a is circular in section perpendicular to the spool spindle 15 axis X. However, the front end 7c may also be formed into a non-circular shape, as shown in FIG. 6. Therein, the front end 7c in section perpendicular to the axis X is formed into an elliptical shape.

Figure 7:
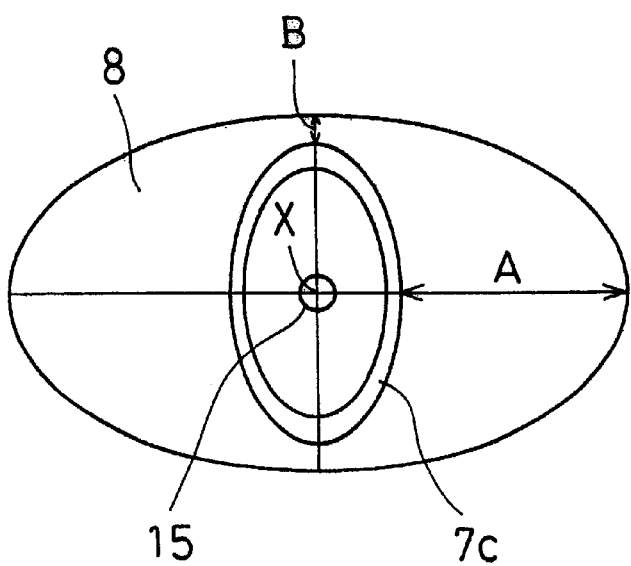
FIG. 7 is a view equivalent of the FIG. 4 of a spinning reel in accordance with still another embodiment of the present invention.

(c) The flange 8 and the front end 7c of the bobbin trunk 7a in section perpendicular to the spool spindle 15 axis X together may be elliptical, as shown in FIG. 7, wherein the major axes of the flange 8 and the front end 7c are orthogonal.

Figure 8A:
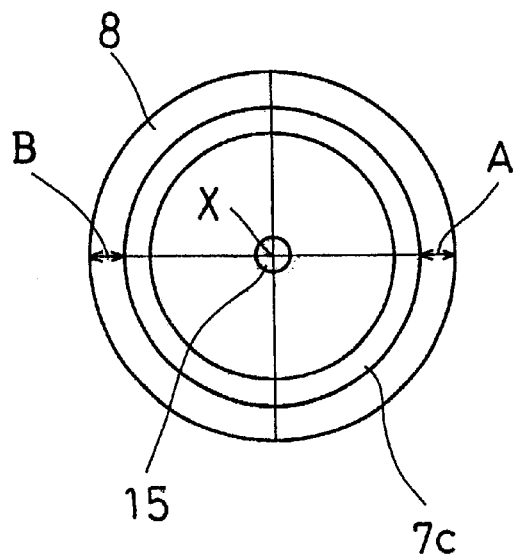
FIG. 8 is a view equivalent of the FIG. 4 of a spinning reel in accordance with still another embodiment of the present invention.
Figure 8B:
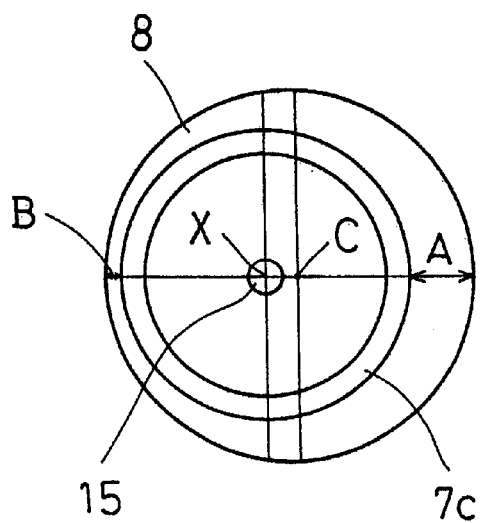
Figure 9A:
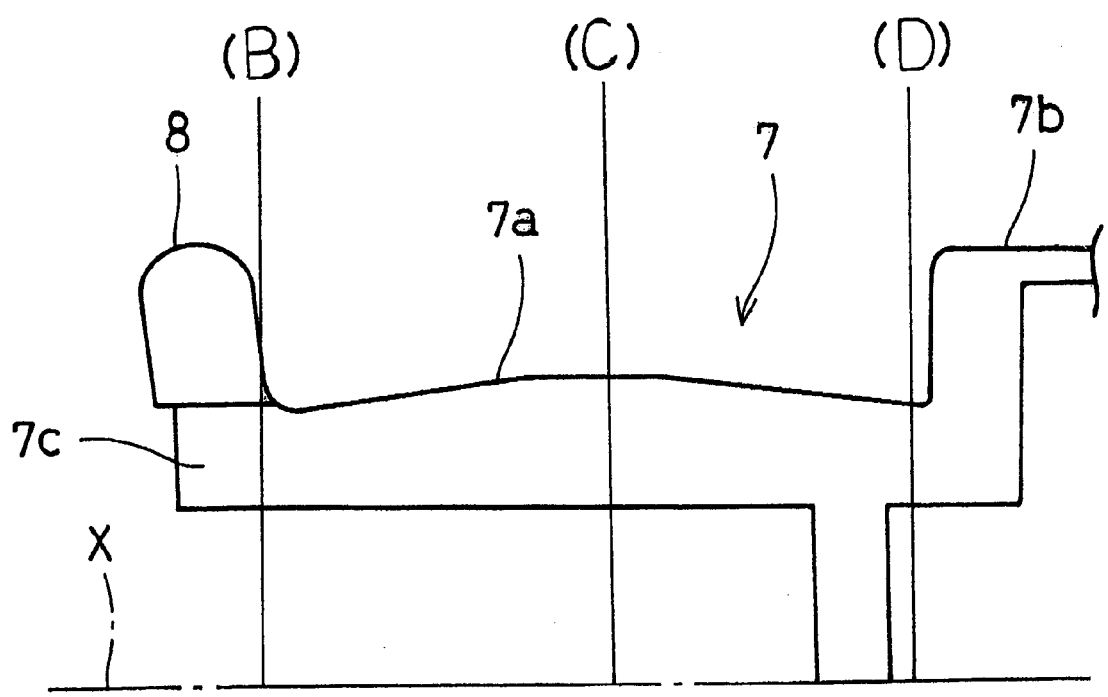
FIG. 9 is a view equivalent of the FIG. 4 of a spinning reel in accordance with still another embodiment of the present invention.
Figure 9B:
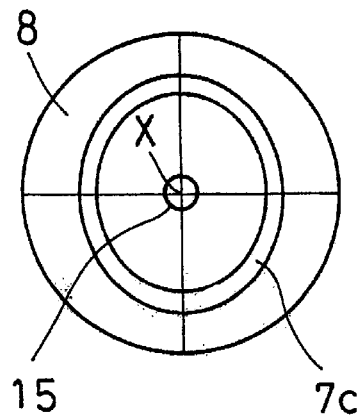
Figure 9C:
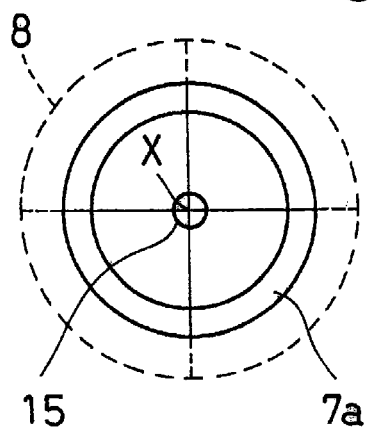
Figure 9D:
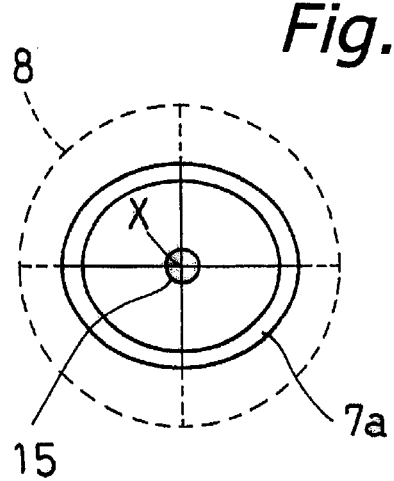

(d) The flange 8 and the front end 7c of the bobbin trunk 7a in section perpendicular to the spool spindle 15 axis X together may be circularly shaped. This may be wherein A=B as shown in FIG. 8A, or wherein a difference in distance A–B appears by shifting the flange 8 to offset the flange 8 center C as shown in FIG. 8B. Different means instead of the flange-fixing member 9 may then be used to fix the flange 8 to the spool main body 7, so that the flange can be shifted relative to the spool main body 7.

Figure 10:
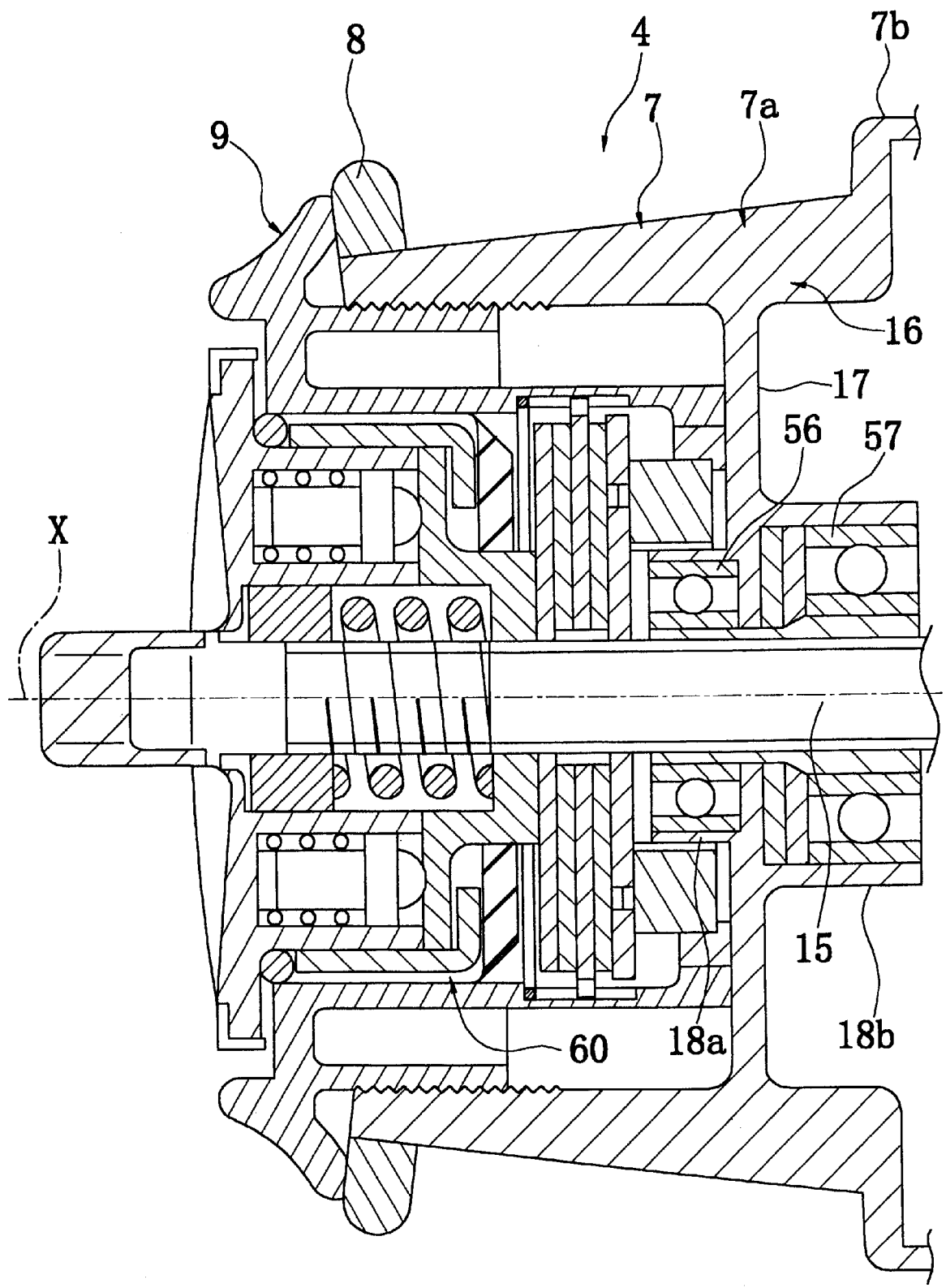
FIG. 10 is an enlarged cross sectional view of a spool in accordance with the second embodiment.

(e) When the front end 7c of the bobbin trunk 7a is non-circular in section perpendicular to the spool spindle 15 axis X, sections of the bobbin trunk 7a perpendicular to the axis X as indicated in FIG. 10A may vary in shape section by section, as shown in FIGS. 10B–10D. Herein, the bobbin trunk 7a is formed such that the major axis of its elliptically shaped front end 7c is orthogonal to the major axis of its elliptically shaped rear end.

(f) Both the flange 8 and the front end 7c of the bobbin trunk 7a in section perpendicular to the spool spindle 15 axis X may be shaped into non-circular forms such ellipses or polygons.

(g) The flange 8 and the bobbin trunk 7a may be formed such that there is the difference in distance A–B between them is at least 1 mm or more.

Second Embodiment

In,describing a second embodiment of the present invention, explanation will be omitted with regard to configuration and operation that is the same as the first embodiment.

Figure 11:
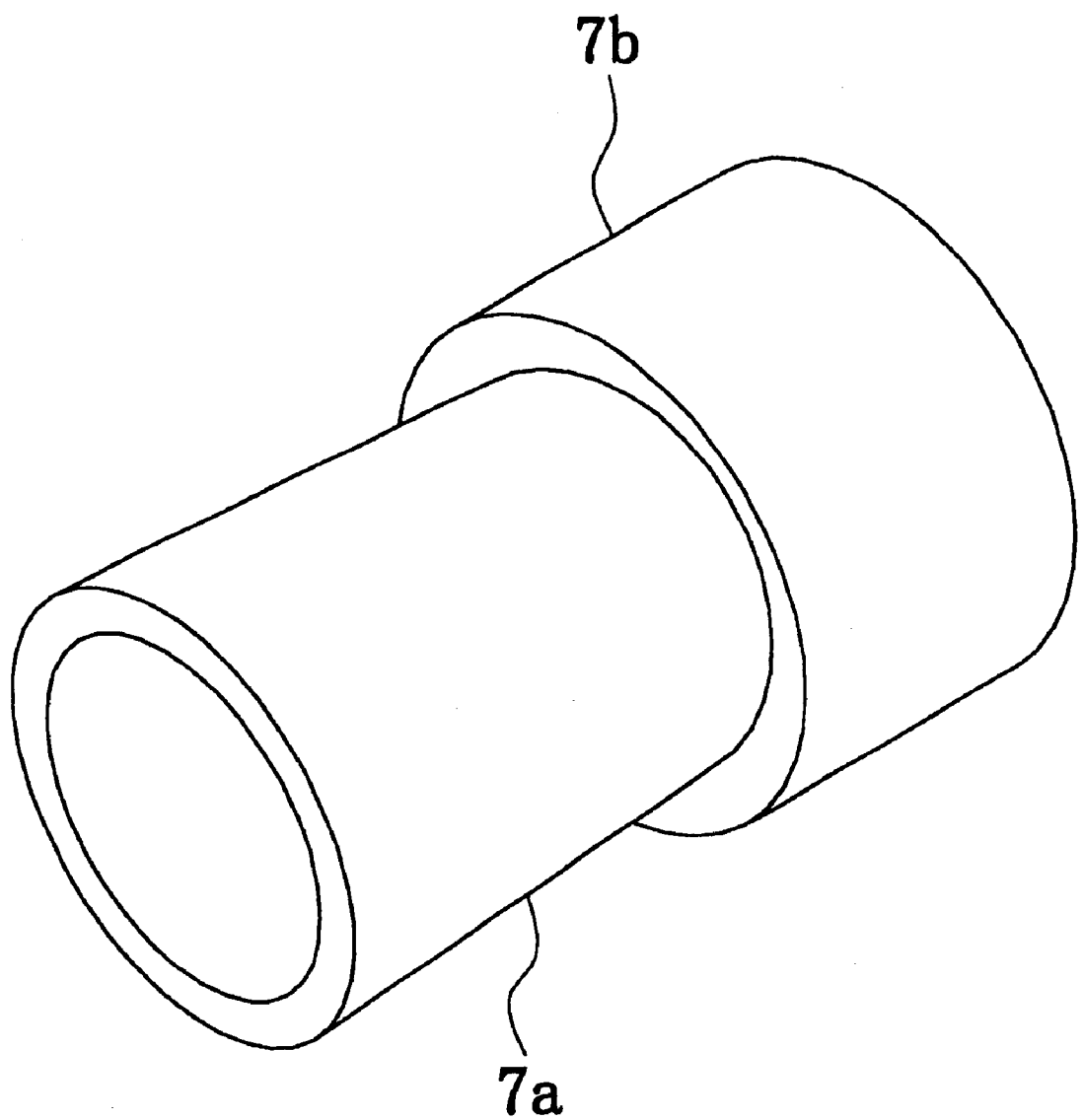
FIG. 11 is a perspective view of the aforementioned spool.
Figure 12:
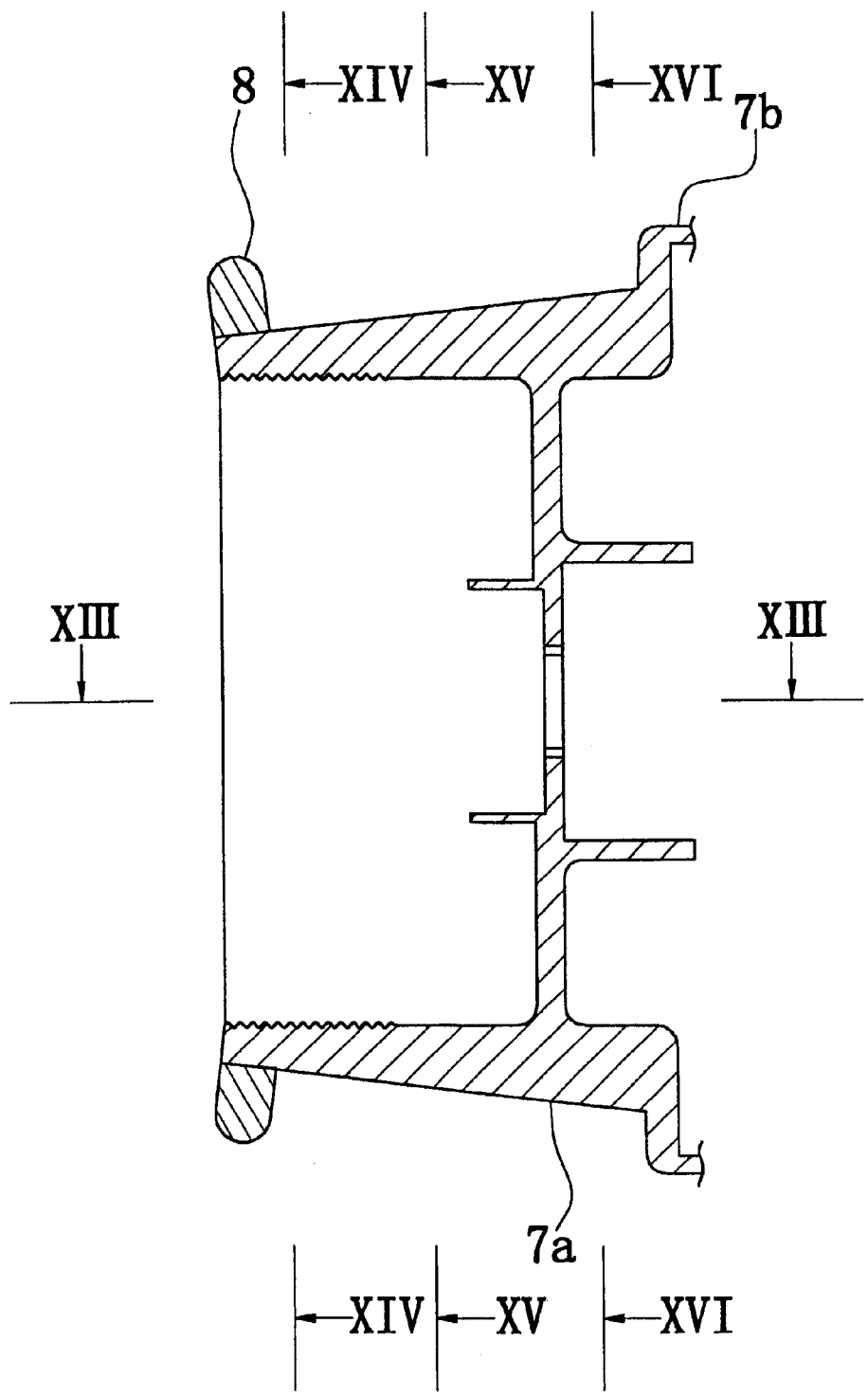
FIG. 12 is a cross sectional view of the aforementioned spool as cut in line XII—XII.
Figure 13:
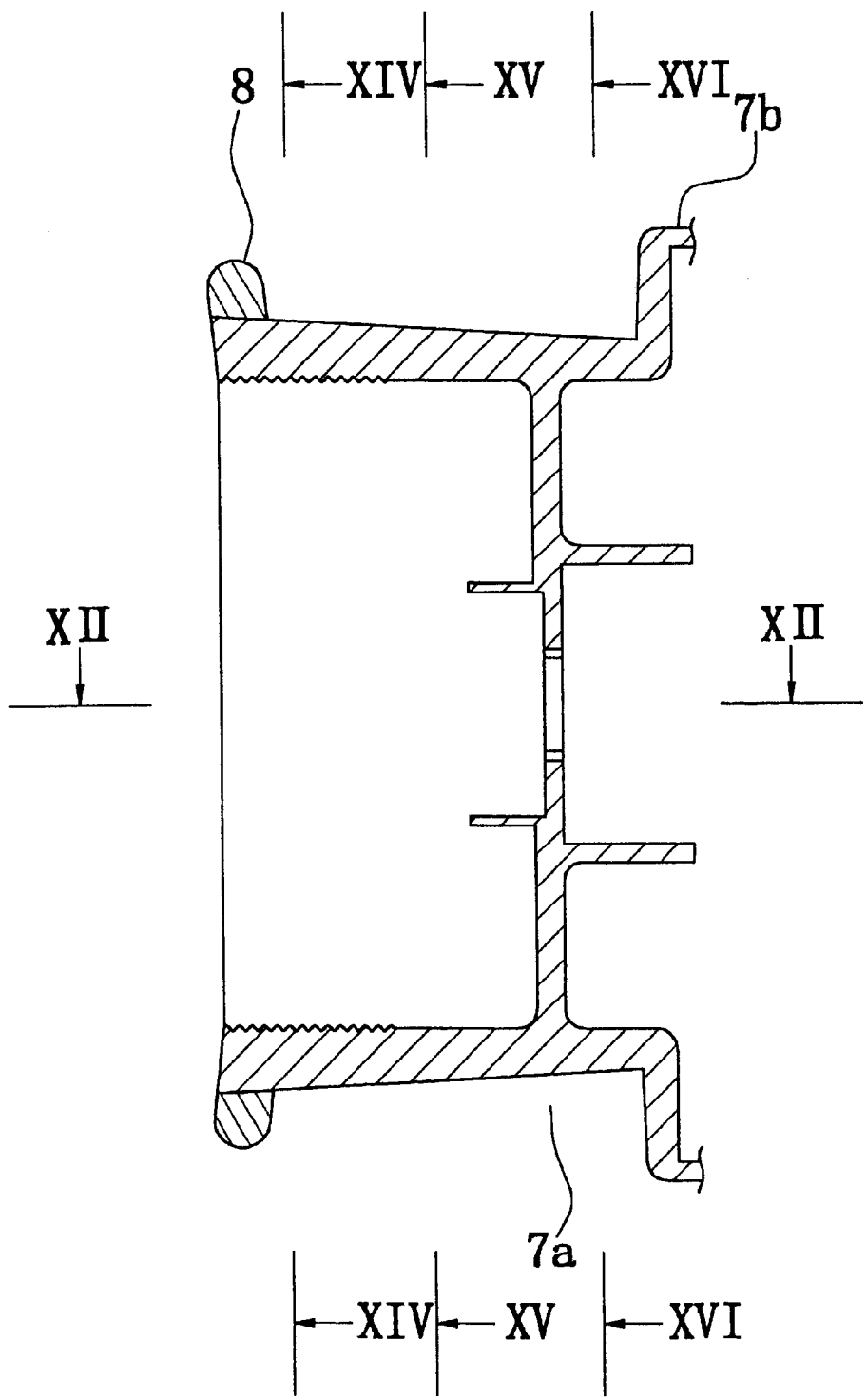
FIG. 13 is a cross sectional view of the aforementioned spool as cut in line XIII—XIII.
Figure 14:
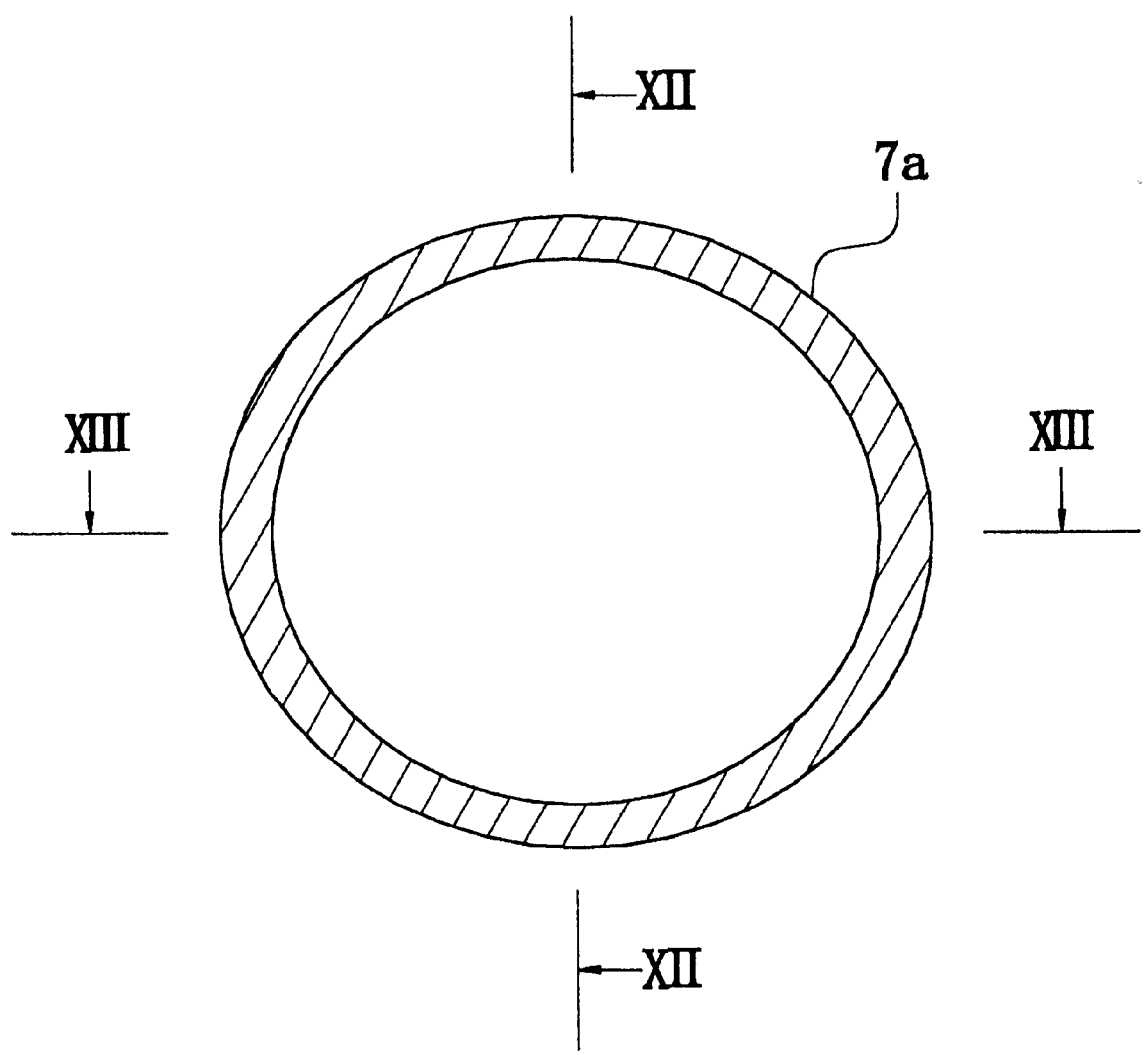
FIG. 14 is a cross sectional view of the aforementioned spool as cut in line XIV—XIV.
Figure 15:
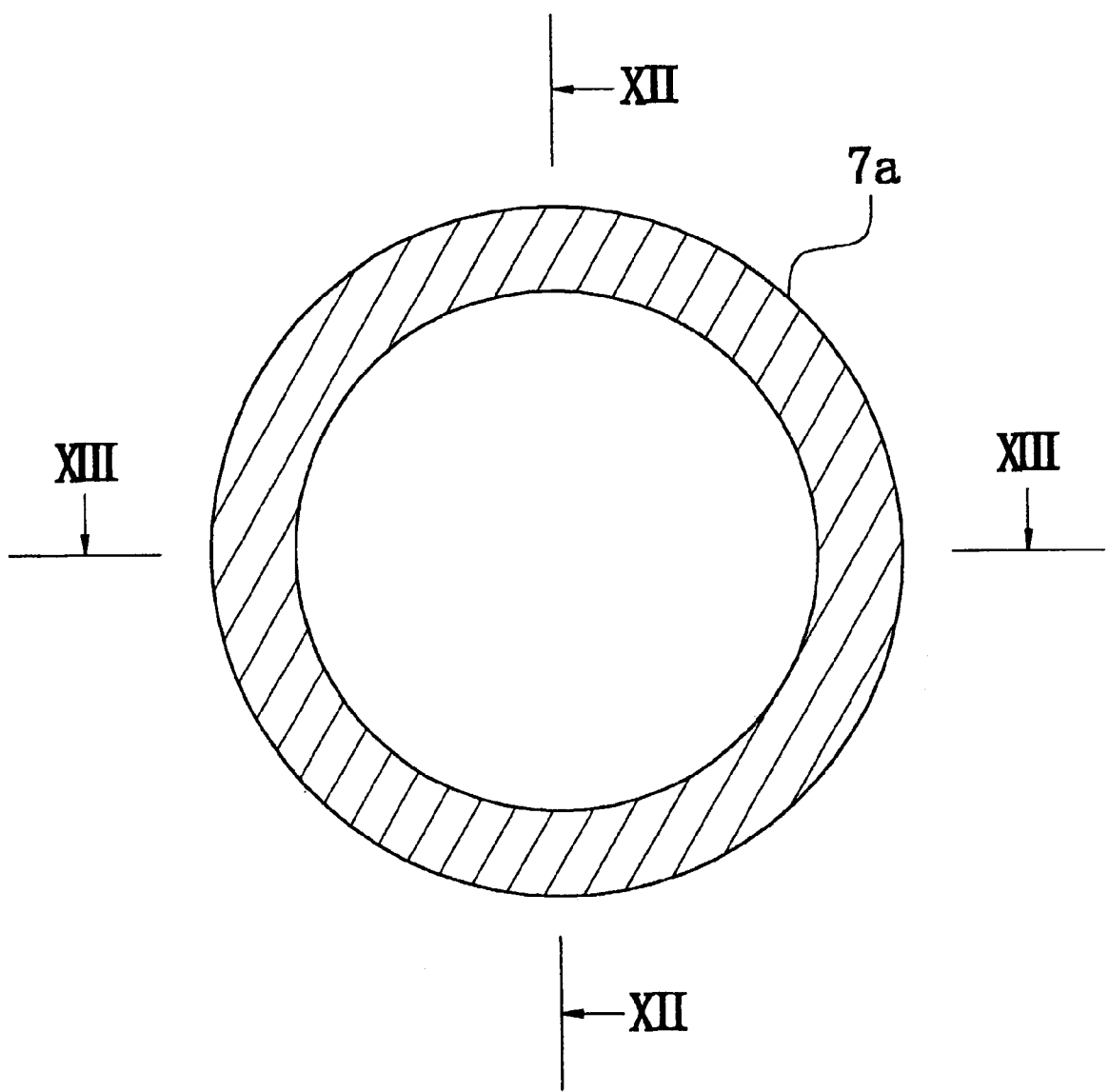
FIG. 15 is a cross sectional view of the aforementioned spool as cut in line XV—XV.
Figure 16:
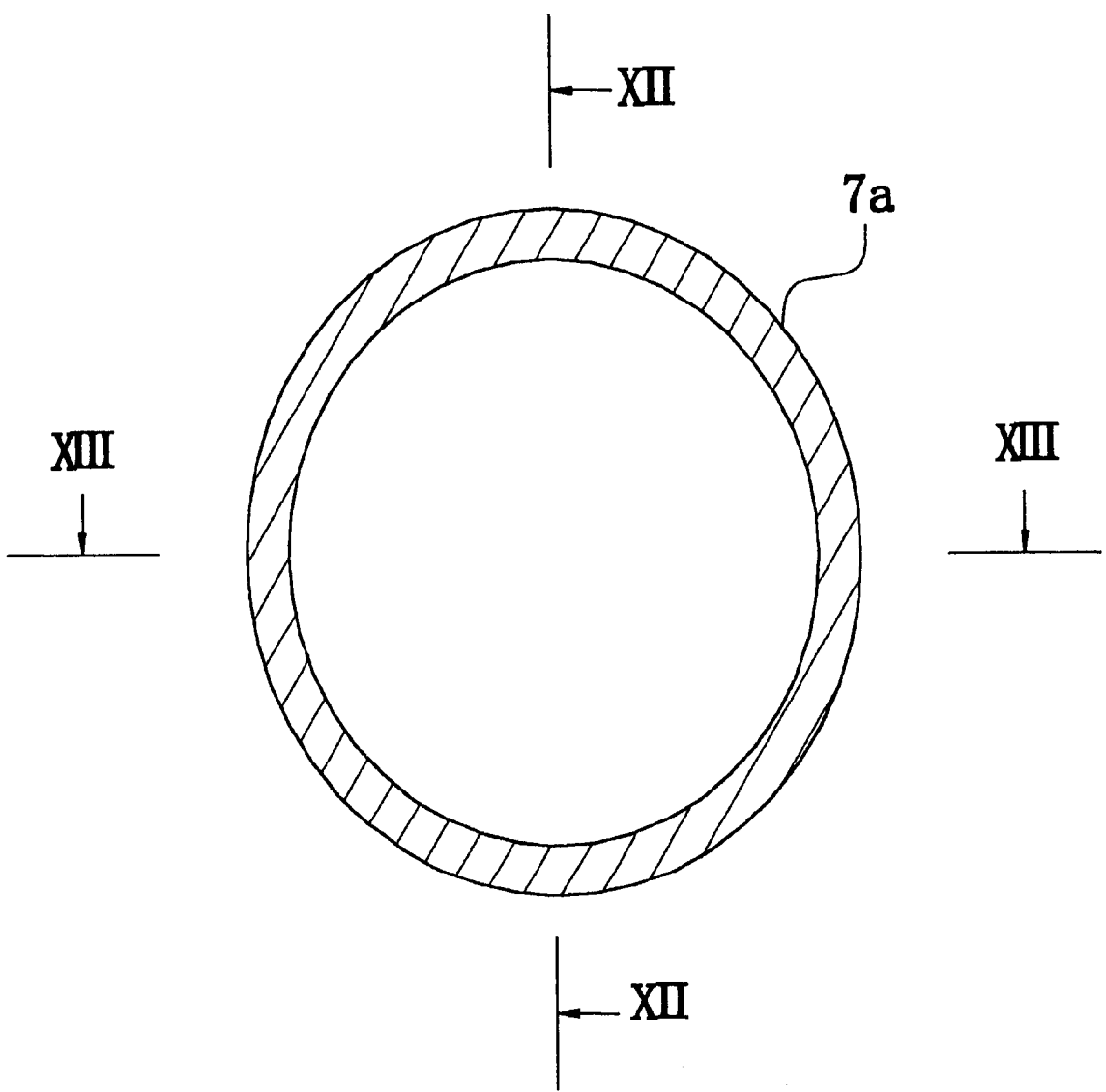
FIG. 16 is a cross sectional view of the aforementioned spool as cut in line XVI—XVI.

As shown in FIG. 11, the spool 4 is a deformed spool wherein the bobbin trunk 7a is a tube having different cross sections at different positions, instead of a uniform cross section. As illustrated in FIGS. 12 and 13, the spool spindle 15 in the section that includes the axis X of the spool spindle 15 is an isosceles trapezoid, in which the front and rear ends are of different length. Furthermore, FIG. 12 shows a regular taper in which the radius shrinks gradually toward the front end. On the other hand, in FIG. 13, which is orthogonal to the section shown in FIG. 12, the front end in section perpendicular to the axis X is a reverse taper in which the radius shrinks toward the rear end. Referring to FIGS. 14–16, the front end in section perpendicular to the axis X (FIG. 14) is an ellipse, while the rear end in section perpendicular to the axis X (FIG. 16) is an oppositely oriented ellipse whose major and minor axes are orthogonal to those of the front end ellipse. The portion of the spool between the front and rear ends in section perpendicular to the axis X (FIG. 15) is a circle.

Since the bobbin trunk 7a is formed into reverse and regular tapers, backlash and line-drop at when winding on the fishing line are less likely to occur.

Third Embodiment

Figure 17:
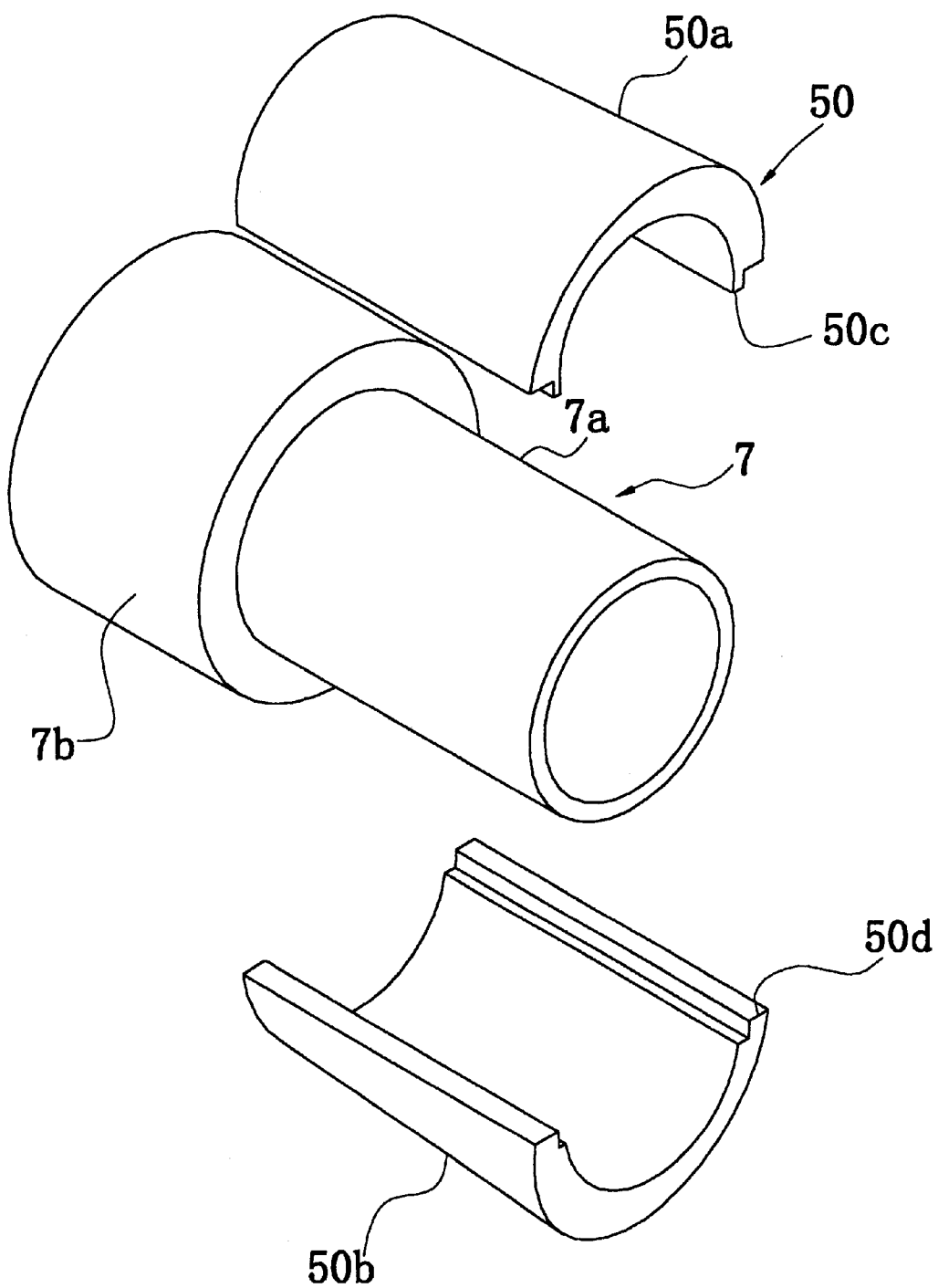
FIG. 17 is an exploded perspective view of a line economizer in accordance with the second embodiment of the present invention.
Figure 18:
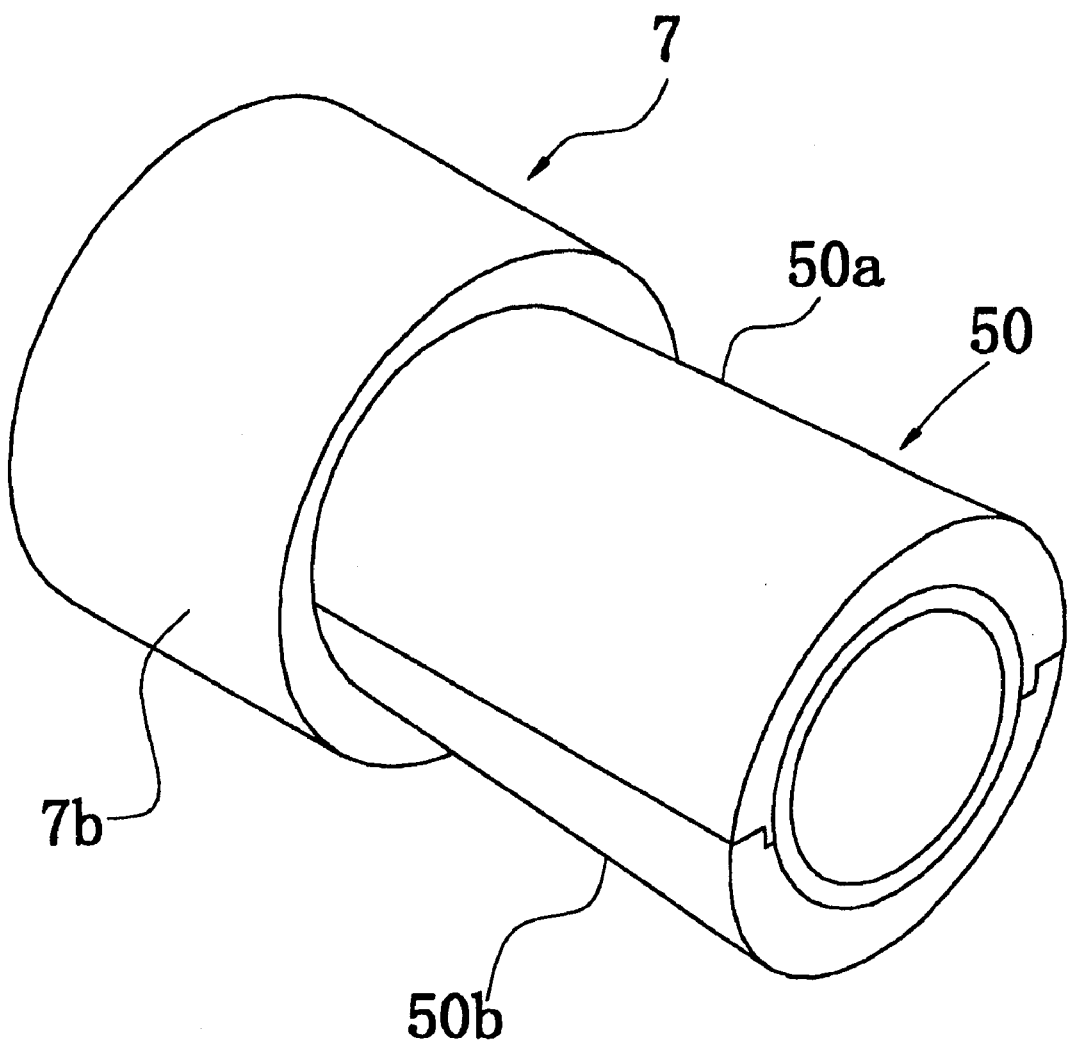
FIG. 18 is a perspective view of a line economizer in accordance with the third embodiment of the present invention as coupled to the spool.

FIG. 17 illustrates a line economizer 50. The line economizer 50 is tubular component made of synthetic resin (polymer) or metal having two separable elements, a first trunk part 50a and a second trunk part 50b. The bore of the line economizer 50 is formed for fitting the bobbin trunk 7a of the spool 4, wherein the inner peripheral sides of the first and second trunk parts 50a and 50b fit onto the bobbin trunk 7a. Along where the first and second trunk parts 50a and 50b spilt, mortise-and-tenon engagement portions 50c and 50d are respectively formed, for radially securing the first and second trunk parts 50a and 50b. The outer periphery of the line economizer 50 when fitted onto the bobbin trunk 7a as FIG. 18 illustrates is a deformed spool. Sections through the line economizer 50 at different points differ, as in the case with the spool 4 according to the second embodiment. Other structures for the line economizer 50 are the same as for the second embodiment spool 4, and therefore will not be explained. Forming the first and second trunk parts 50a and 50b of the line economizer 50 into reverse and regular tapers enables backlash and line-drop prevention.

Figure 19:
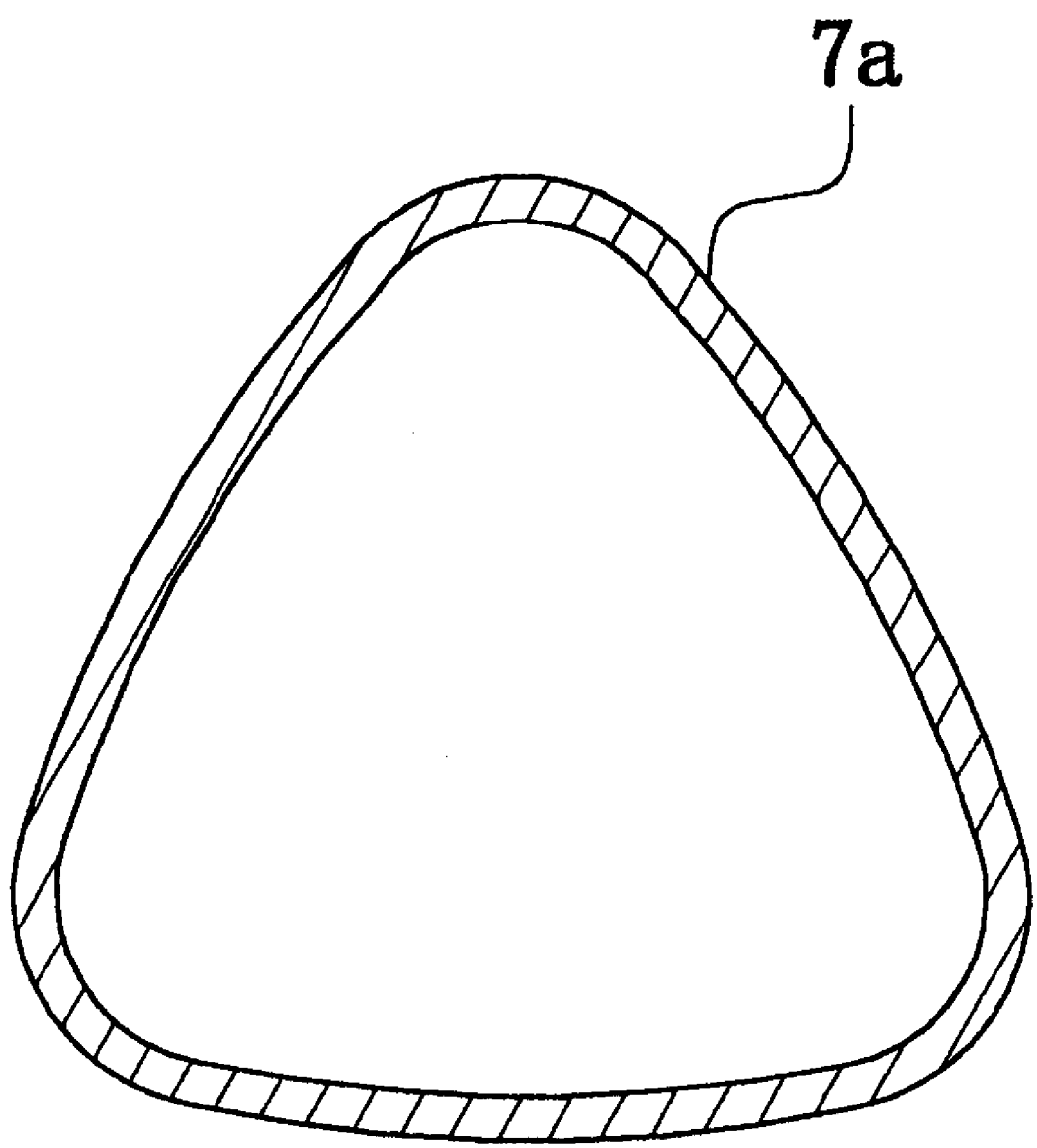
FIG. 19 is a view equivalent of the FIG. 7 of a spool in accordance with still another embodiment of the present invention.
Figure 20:
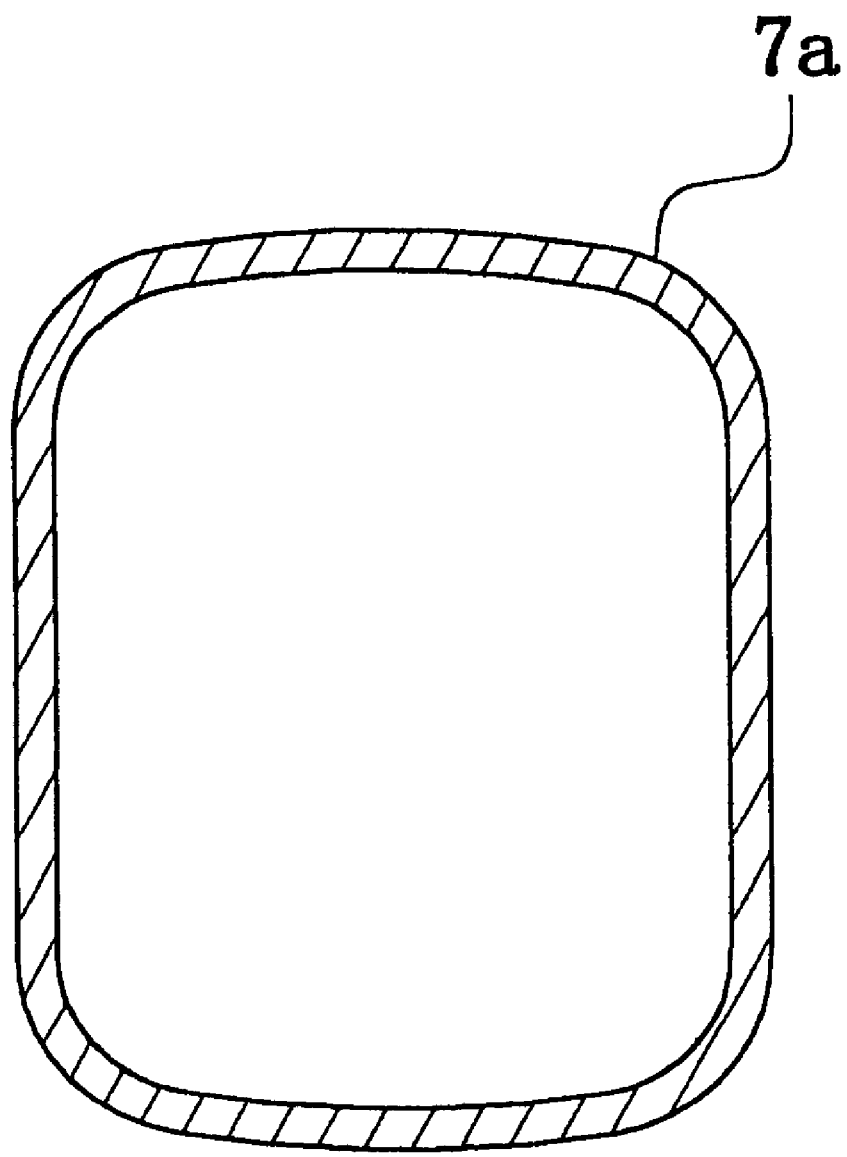
FIG. 20 is a view equivalent of the FIG. 7 of a spool in accordance with still another embodiment of the present invention.

Modifications (h) Although the bobbin trunk 7a in section perpendicular to the spool spindle 15 axis X is an ellipse in the previous embodiments, the third embodiment is not thus limited. For instance, it may be substantially triangular or rectangular in cross section, as shown in FIGS. 19 and 20.

(i) Although the bobbin trunk 7a in the section that includes the axis X is an isosceles trapezoid in the second and third embodiments, the present invention is not limited thereto.

(j) The spool in sections perpendicular to the axis X and in the section that includes the axis X is not limited to the second and third embodiments, and may take arbitrary forms in section.

According to the present invention, fishing line winds on to the level where the height of the flange is lowest (minimum position), whereby line is not wound as far as the outer peripheral ends of the flange. This prevents outward backlash of the line off the flange. In another principal aspect of the invention, forming bobbin trunk into normal and reverse tapers prevents backlash and line-drop.

Various details of the present invention may be changed without departing from its spirit nor its scope. Furthermore, the foregoing description of the embodiments according to the present invention is provided for illustration only, and not for the purpose of limiting the invention as defined by the appended claims and their equivalents.

What is claimed is:

1. For a spinning reel, a spool movable relative to the reel body back and forth together with a spindle for the spool, said spool comprising:

a non-round bobbin trunk peripherally onto which fishing line is wound, said bobbin trunk provided on the spool spindle and non-circular in section perpendicular to the spool spindle axis; and a flange disposed front-endward on said bobbin trunk, said flange having an outer periphery protruding outwardly from the outer periphery of said bobbin trunk over the entire circumference thereof; wherein the height of said flange relative to said bobbin trunk perimetrically is at least partially not uniform such that said flange diametrically is in at least one portion equal to the maximum diameter fishing line winds onto said bobbin trunk, and is diametrically larger in the remainder.

2. A spool as set forth in claim 1, wherein said bobbin trunk is elliptical in section substantially perpendicular to the spool spindle axis.

3. For a spinning reel, a spool movable relative to the reel body back and forth together with a spindle for the spool, said spool comprising:

a tubular bobbin trunk provided on the spool spindle, wherein fishing line is wound peripherally on to said bobbin trunk; and a flange disposed front-endward on said bobbin trunk, said flange having an outer periphery protruding outwardly from the outer periphery of said bobbin trunk over the entire circumference thereof; wherein
both said bobbin trunk and said flange in section substantially perpendicular to the spool spindle are ellipses whose major axes are orthogonal.

4. For a spinning reel, a spool movable relative to the reel body back and forth together with a spindle for the spool, said spool comprising:
   a tubular bobbin trunk provided on the spool spindle, wherein fishing line is wound peripherally on to said bobbin trunk; and
   a flange disposed front-endward on said bobbin trunk, said flange having an outer periphery protruding outwardly from the outer periphery of said bobbin trunk over the entire circumference thereof; wherein
   both said bobbin trunk and said flange in section substantially perpendicular to the spool spindle are circles whose centers are offset from each other.

5. A spool as set forth in claim 4, wherein said bobbin trunk and said flange are provided with means to make one movable relative to the other for bringing their respective centers into coincidence and making the height of said flange constant relative to said bobbin trunk perimetrically.

6. For a spinning reel, a spool movable relative to the reel body back and forth together with a spindle for the spool, said spool comprising:
   a bobbin trunk disposed on the spool spindle, wherein fishing line is wound peripherally on to said bobbin trunk;
   a flange of larger diameter than said bobbin trunk front-endward in outer diametrical dimension, provided front-endward on said bobbin trunk; and
   a skirt portion of larger diameter than said bobbin trunk rear-endward in outer diametrical dimension, provided rear-endward on said bobbin trunk;
   said bobbin trunk being formed such that
      in a first planar section in which the axis of the spool spindle lies, the radius of the bobbin trunk is shorter at the front end of the spool than at the rear end of the spool, and
      in a second planar section which is non-coincident with the first planar section and in which the axis of the spool spindle lies, the radius of the bobbin trunk is longer at the front end of the spool than at the rear end of the spool.

7. A spool as set forth in claim 6, wherein said bobbin trunk is formed such that:
   diametrical dimension of the bobbin trunk in the first planar section decreases heading from the rear end toward the front end; and
   diametrical dimension of the bobbin trunk in the second planar section increases heading from the rear end toward the front end.

8. A spool as set forth in claim 6, wherein at least one of cross-sections substantially perpendicular to the axis of said spool spindle in the front end and rear end is non-circular.

9. A spool as set forth in claim 8, wherein at least one of the cross-sections substantially perpendicular to the axis of said spool spindle in the front end and rear end is elliptical.

10. A spool as set forth in claim 8, wherein at least one of the cross-sections substantially perpendicular to the axis of said spool spindle in the front end and rear end is substantially polygonal.

11. A spool as set forth in claim 6, wherein the axis-containing first planar section and the axis-containing second planar section are orthogonal.

12. A spool as set forth in claim 6, wherein at least one of the first and second planar sections is substantially trapezoidal.

13. A spool as set forth in claim 6, wherein said bobbin trunk in at least one place between the front end and rear end is circular in cross-section substantially perpendicular to the axis of said spool spindle.

14. A line economizer for attachment to a spool for a spinning reel, the spool being formed with a cylindrical bobbin trunk and relative to the reel body being movable back-and-forth together with an axis-defining spindle for the spool, said line economizer comprising:
   detachable line economizer trunk parts for fitting circumferentially onto the spool bobbin trunk, wherein fishing line is wound peripherally on to said line economizer trunk parts;
   said line economizer trunk parts being formed such that when fitted onto the spool bobbin trunk to form the line economizer,
   in a first planar section in which the axis of the spool spindle lies, the radius of the bobbin trunk is shorter at the front end of the spool than at the rear end of the spool, and
   in a second planar section which is non-coincident with the first planar section and in which the axis of the spool spindle lies, the radius of the bobbin trunk is longer at the front end of the spool than at the rear end of the spool.

* * * * *